United States Patent [19]

Saito

[11] Patent Number: 4,843,367
[45] Date of Patent: Jun. 27, 1989

[54] CAR'S BACK-UP ALARM FITTED WITH SPEECH FUNCTION

[75] Inventor: Masayuki Saito, Tokyo, Japan

[73] Assignee: Yamaguchi Electric Ind., Co., Ltd., Tokyo, Japan

[21] Appl. No.: 171,124

[22] Filed: Mar. 21, 1988

[30] Foreign Application Priority Data

Jun. 25, 1987 [JP] Japan .................. 62-97881

[51] Int. Cl.⁴ ............................................. B60Q 1/26
[52] U.S. Cl. .................................... 340/463; 340/474
[58] Field of Search ................ 340/52 R, 72, 71, 70, 340/311.1

[56] References Cited

U.S. PATENT DOCUMENTS 3,051,944  8/1962  Smith ............................. 340/384 E
3,173,136  3/1965  Atkinson ....................... 340/384 E
3,818,438  6/1974  Stacha, Jr. ........................... 340/70

Primary Examiner—Joseph A. Orsino
Assistant Examiner—Jeffery A. Hofsass
Attorney, Agent, or Firm—Holman & Stern

[57] ABSTRACT

The present invention relates to a car's back-up alarm, and particularly a back-up alarm attachedly provided with a communication function capable of guiding the auto body while the car driver speaking therethrough with person/persons in the outside of the car.

1 Claim, 2 Drawing Sheets

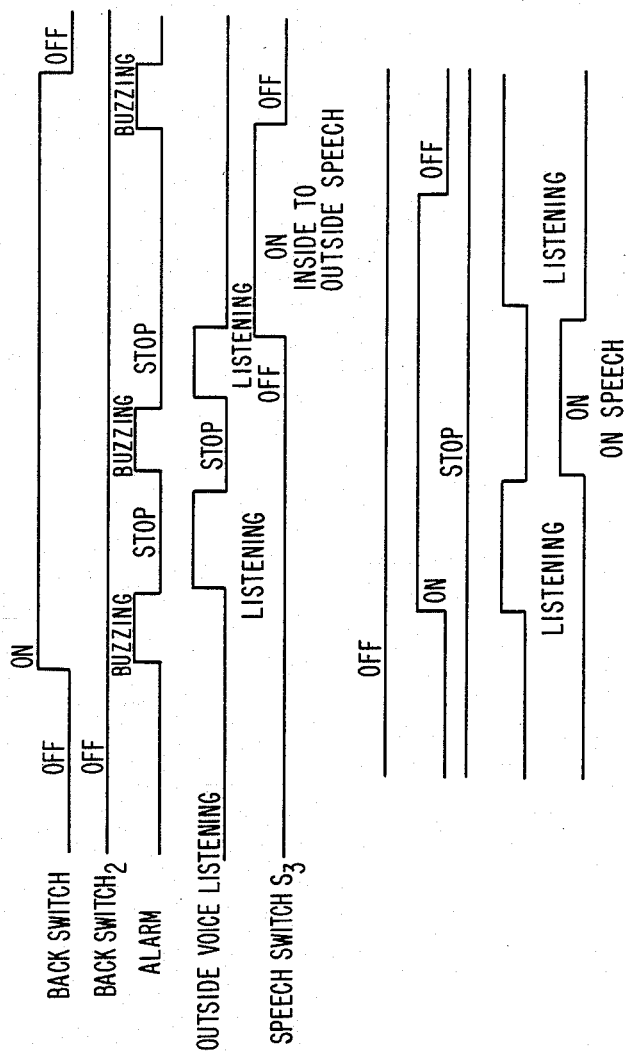

CAR'S BACK-UP ALARM FITTED WITH SPEECH FUNCTION

BACKGROUND OF THE INVENTION

The present invention relates to a car's back-up alarm, and particularly relates to a car's back-up alarm including a function which allows speech between the driver and person/persons outside the car at the time of the car moving backward.

In the case of driving a car in reverse gear, since such accidents as person/persons who was/were outside the car, particularly behind the car was/were hurt by the car have often occured, a construction of buzzing an alarm automatically at the time of its moving back is adopted.

However, the alarming for the backward moving with buzzing along may not assure the safety as it does not at all give notice of backward movement to both drivers and person/persons outside.

SUMMARY OF THE INVENTION

The subject of the present invention is to provide a back-up alarm which much more assures a better guiding of the auto body and safety by means of speech between the driver of the car and person/persons outside the car.

The means of the present invention comprises having provided a back/up switch which closes in linkage with a reverse gear operation member, having installed a handset at the driver's seat, having fixed a combination speaker/microphone in the rear of the auto body, and having placed a back/up switch and a handset in the electric circuit connecting the power to said combination speaker/microphone.

BRIEF DESCRIPTION OF DRAWING

FIG. 3 is an interrupted wave circuit diagram.

DETAILED DESCRIPTION OF THE PREFERRED EMBODIMENTS

Figure 1:
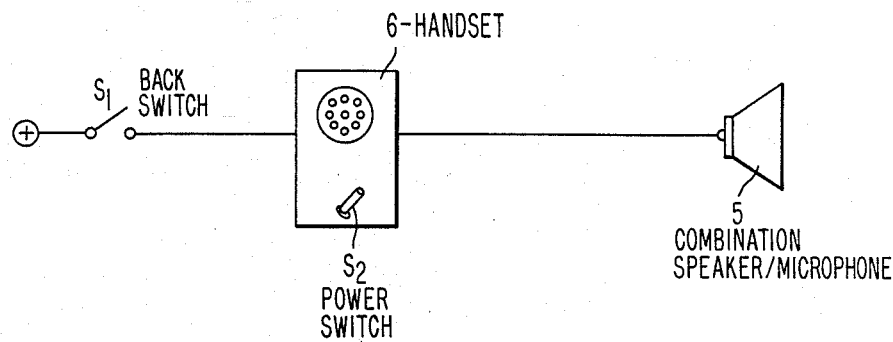
FIG. 1 of the drawing is a diagram of the car's back-up alarm fitted with speech function.

In the FIG. 1, $S_1$ is a back/up switch which is placed in the electric circuit between the power source and the handset 6 installed at the driver's seat, such that the back/up switch $S_1$ is provided to be closed automatically upon engaging the reverse gear of transmission gear by means of an operation lever in the auto body.

A combination speaker/microphone 5 is fixed in the rear of the auto body to which speaker/microphone the handset 6 is connected.

Figure 2:
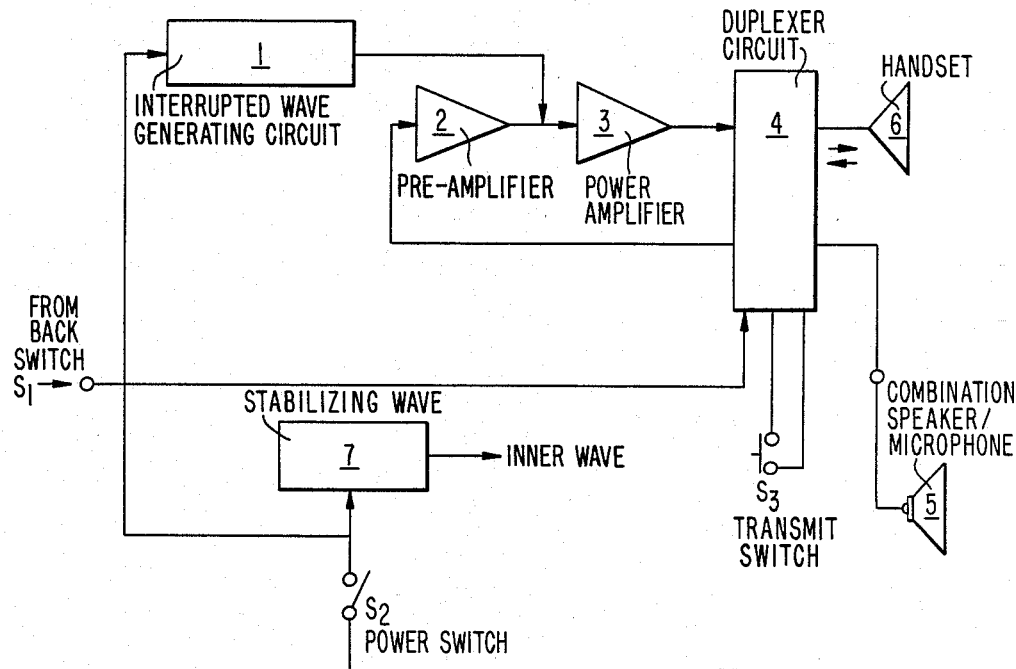
FIG. 2 is a block circuit diagram.

In the FIG. 2, $S_2$ is a power switch which actuates the three modes as mentioned later. And, the inside of handset 6, as shown in FIG. 2, comprises an interrupted wave generating circuit 1, a pre-amplifier 2, a power amplifier 3, a duplexing circuit 4, and a power stabilizing wave circuit 7 and also a transmitter/receiver 6. $S_3$ is a handset switch of this device as will be described herein referring to FIG. 2.

Mode 1. In the case of speaking from the outside of the car and receiving it in the car-When power switch $S_2$ is thrown, the outside voice can always be listened to at the driver's seat.

Mode 2. In the case of speaking from the inside of the car and receiving (loud speaking) it outside of the car-When speaking over the handset 6 by keeping the transmit switch $S_3$ pushed, it can be loud spoken to the outside of the car.

Mode 3. In the case of listening to the voice outside of the car at the same time of generating the alarm - Even when the power switch $S_2$ is not thrown, turning the back/up switch $S_1$ on actuates the circuit automatically for generating the sound of the alarm intermittently and, moreover, the voice outside of the car can be listened to at the driver's seat while the sound of the intermitted alarm is halted. At this stage, the Mode 2 condition above can be obtained by pushing the transmit switch $S_3$, then speech can be done. The timing of speech/alarm is as shown in FIG. 3.

In the present invention, speech between the driver and person/persons outside the car can be made and, since every confirmation is made by sound, a high safety factor is obtained which is optimal for guiding a backward moving car, especially a sight seeing bus and garbage truck and gives a practical value.

What is claimed is:

1. In a vehicle having a body, a source of electric power and a transmission, a vehicular back-up alarm with two-way speech function, comprising:

a combination speaker/microphone provided in the rear of the vehicle body;

a handset provided at a driver's seat of the vehicle, the handset having a transmitter/receiver, and interrupted wave generating circuit, a preamplifier, a power amplifier, a duplexing circuit and a power stabilizing wave circuit, the handset being operably connected with the source of electric power and with the combination speaker/microphone by an electrical circuit;

a back-up switch operably connected with the vehicle transmission and placed in the electrical circuit between the source of electrical power and the handset, the back-up switch being actuable upon engaging of a reverse gear of the vehicle transmission for supplying electrical power to the handset to cause the handset to generate an alarm signal to the combination speaker/microphone;

a power switch means provided at the handset and actuable for operably connecting the combination speaker/microphone with the handset for permitting speech at the combination speaker/microphone to be heard at the handset; and a transmit switch means provided at the handset and actuable for operably connecting the handset with the combination speaker/microphone for permitting speech at the handset to be heard at the combination speaker/microphone.

* * * * *